United States Patent [19]

O'Brien et al.

[11] 4,247,767
[45] Jan. 27, 1981

[54] TOUCH SENSITIVE COMPUTER INPUT DEVICE

[75] Inventors: C. Douglas O'Brien, Ottawa; Herbert G. Bown; Thomas E. Green, both of Kanata, all of Canada

[73] Assignee: Her Majesty the Queen in right of Canada, as represented by the Minister of National Defence, Ottawa, Canada

[21] Appl. No.: 951,635

[22] Filed: Oct. 16, 1978

[30] Foreign Application Priority Data

May 5, 1978 [CA] Canada .................................. 300474

[51] Int. Cl.³ .......................................... H01J 40/14
[52] U.S. Cl. ................................ 250/221; 250/222 R
[58] Field of Search .................... 250/221, 222 R, 560

[56] References Cited

U.S. PATENT DOCUMENTS

| 3,128,340 | 4/1964 | Harmon | 250/222 R X |
| 3,187,185 | 6/1965 | Milnes | 250/222 R |
| 3,764,813 | 10/1973 | Clement et al. | 250/221 |

Primary Examiner—David C. Nelms
Assistant Examiner—Darwin R. Hostetter
Attorney, Agent, or Firm—Larson, Taylor and Hinds

[57] ABSTRACT

Apparatus for detecting the position of an object, e.g. for interaction with a computer graphic display, has a number of light emitting diodes in an endless array, and a lesser number of light detecting devices for providing electrical signals in response to momentary and successive energization of the light emitting diodes. The signals are electronically processed to provide cartesian co-ordinates. This apparatus provides high resolution with a minimum number of light detecting devices and enables too large objects and malfunctions to be readily detected.

13 Claims, 11 Drawing Figures

TOUCH SENSITIVE COMPUTER INPUT DEVICE

The present invention relates to apparatus for detecting the position of an object, and is applicable, in particular, to graphic display apparatus having a display screen for displaying computer information.

Various prior art apparatuses exist for the purpose of interacting with a computer generated image on a display screen, but most of these prior art apparatuses require a special stylus to be used and many are totally separated from the display tube, so that the computer must generate a marker cursor on the display tube so that the user can know where he is pointing.

In one prior art apparatus, a pen-like instrument containing a photodetector is placed on the surface of the display screen, and a signal is generated when light from the beam regenerating the display tube passes the photodetector. This prior art apparatus can only detect luminous areas of the display screen and is awkward to use, because the pen-like instrument must be attached to the computer by a cable.

One example of a prior art apparatus which requires the use of a cursor is a control arm or "Joy stick". With this device, the user controls the tilt of a control arm, which in turn controls the position of the cursor on the display screen. However, such apparatuses, which are separated from the display screen, cause an undesirable psychological disorientation.

It has also been proposed, for example in U.S. Pat. No. 3,764,813, issued Oct. 9, 1973 to Frank John Clement et al, and "Electronics", Oct. 11, 1971, to provide an arrangement comprising a plurality of light sources spaced apart from a corresponding plurality of photodetectors, to provide a plurality of crossed light beams so that, when the arrangement is in use, an operator can use a finger or other pointer to interrupt one of the light beams, the co-ordinates of the finger or pointer interrupting the light beam then being determined electronically. It has further been proposed to pulse the light sources to eliminate the need for collimating lenses and to increase the instantaneous power in the light beams.

However, the disadvantage of these prior proposals is that they provide low resolution. Thus, since photodetectors and their associated electronic circuitry are expensive, and since a photodetector is required for each light beam, relatively few light beams are used. The consequential wide spacing of the light beams reduces the number of photodetectors required, but lowers resolution, thus restricting the number of distinct locations of the finger, pointer or other object which can be detected.

It is accordingly an object of the present invention to provide a novel and improved apparatus for detecting the position of an object, employing a plurality of radiation emitting means and means for detecting radiation, in which a minimum number of the latter are required.

According to the present invention, there is provided apparatus for detecting the position of an object, the apparatus comprising a plurality of radiation emitting means disposed in an array extending around a detection area, means for momentarily and successively energizing the radiation emitting means to emit radiation across the detection area, at least four radiation detecting means spaced apart around the array for providing electrical signals in response to impingement of the radiation on the radiation detecting means, and electronic means for processing the electrical signals to detect interruption of the radiation by the presence of an object in the detection area and for providing data representing the position of the object in the detection area.

Preferably, the energizing means comprise means for generating timing pulses and means responsive to the timing pulses for energizing the radiation responsive means one at a time in sequence around the array, and means may be provided for comparing the electrical signals with the timing signals to eliminate from the electrical signals pulses resulting from the successive energization of the radiation emitting devices.

The present invention further provides apparatus comprising a flat working surface, which in a preferred embodiment comprises the front surface of a display screen for displaying computer information, and in other embodiments comprises any working surface on which a positional indication is used, such as a writing tablet, light emitting devices distributed in an endless array around the working surface for transmitting light across the working surface, means for momentarily energizing the light emitting devices one at a time in succession around the endless array, the energizing means including a timing pulse generator controlling the timing of the energization of the light emitting devices, and a plurality of light detecting devices spaced apart around the working surface for providing respective electrical signals in response to the light, the number of the light detecting devices being less than that of the light emitting devices, each of the light detecting devices having an angle of acceptance embracing a plurality of the light emitting devices and the combined angles of acceptance of the light detecting devices embracing all of the light emitting devices, whereby an object interposed on the working surface in any of the angles of acceptance will modify at least two of the electrical signals in accordance with the position of the object. Electronic data processing means responsive to the electrical signals and to the timing pulses of the pulse generator may be provided for computing the position of the object relative to the working surface.

The invention will be more readily understood from the following description of a preferred embodiment thereof given, by way of example, with reference to the accompanying diagrammatic drawings, in which.

Figure 1:
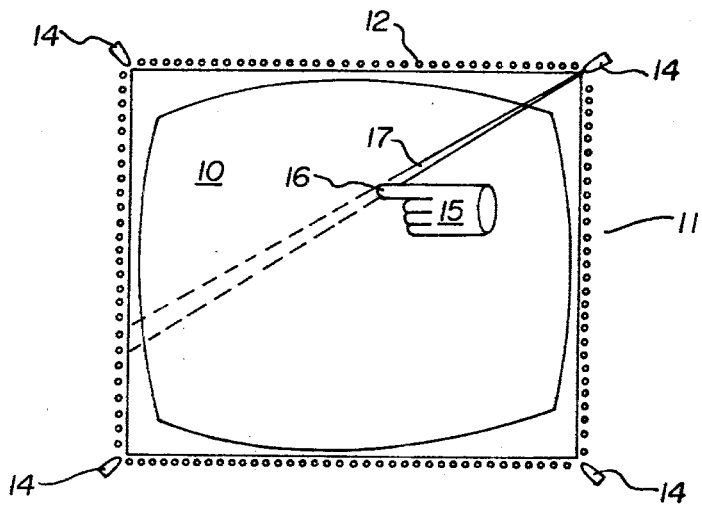
FIG. 1 shows an array of light emitting diodes, and four photodetectors, arranged around the front of a display screen.

The apparatus illustrated in FIG. 1 comprises a display screen 10, which is employed for displaying a computer generated image and which is a substantially square screen of a cathode ray tube.

Around the periphery of the display screen 10, there is provided an endless array, indicated generally by reference numeral 11, of light emitting diodes 12.

The light emitting diodes 12 are spaced a small distance in front of the face of the display screen 10 and are oriented for transmitting light from the light emitting diodes over a detection area or plane within and coplanar with the array 11.

Four or more photodetectors 14 are spaced apart at right angles around the array 11 and are likewise coplanar therewith, the photodetectors 14 serving to receive light emitted from the light emitting diodes 12.

By means which will be described in greater detail hereinafter, the light emitting diodes 12 are momentarily energized one at a time in succession to produce the effect of a light source travelling in an intermittent or stepped fashion around the array.

Figure 2:
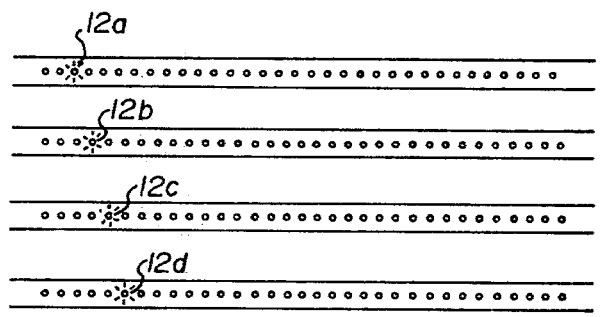
FIG. 2 shows a section of the array of light emitting diodes during the illumination of four successive ones of the light emitting diodes.

This effect is illustrated in FIG. 2, which shows a portion of the array 11 at four successive instances corresponding to the times at which four successive light emitting electrodes 12 of the array 11 are energized.

Thus, as shown at A in FIG. 2, a first one of the light emitting electrodes 12, indicated by reference numeral 12a, is energized and emits light, while the remainder of the light emitting electrodes 12 are de-energized and do not emit light.

At B, C and D, the same portion of the array 11 is illustrated but the three successive light emitting electrodes, indicated by reference numerals 12b, 12c and 12d, are shown as being energized in succession, one at a time.

Referring again to FIG. 1, it will be seen that a hand, indicated generally by reference numeral 15, is shown with its finger 16 introduced into the above-mentioned detection area or plane so as to interrupt the light from one or several of the light emitting diodes 12, which would otherwise be transmitted to the photodetector 14 disposed at the top of the display screen 10. Consequently, during the illumination of the relevant one or several of the light emitting diodes 12, the finger 16 causes an eclipse, represented by the shadow indicated by reference numeral 17. Consequently, of course, the light from the light emitting diode 12 which impinges on the photodetector 14 is modified, and the manner in which this modification and the resulting variation in an output signal from the photodetector 14 is employed in determining the position of the finger 16 over the detection area or plane, or the surface of the display screen 10, will be described hereinafter.

Figure 3:
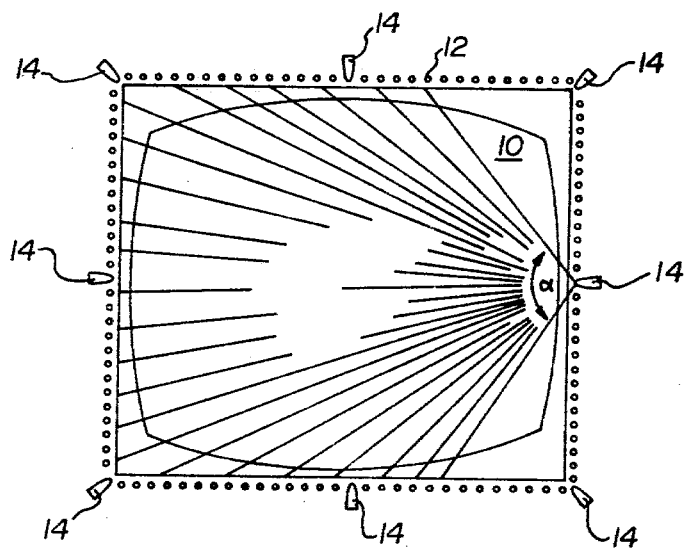
FIG. 3 shows a view corresponding to FIG. 1 but with a larger number of photodetectors and illustrates in particular the angle of acceptance of one of the photodetectors.

FIG. 3 illustrates, by way of example, the acceptance angle of the photodetector 14 at the right-hand side of the display screen 10.

The acceptance angle, which is indicated at α, represents the angle over which the relevant photodetector 14 can receive light from the light emitting diodes 12 lying within the angle of acceptance α.

Referring now to FIG. 3, it will be readily apparent from a comparison of FIGS. 1 and 3 that the combined angles of acceptance of four of the photodetectors 14 can embrace all of the light emitting diodes 12 in the array 11 and cover the entire detection area within the array 11. However, an additional four or more photodetectors may at times be used, as shown e.g. in FIG. 3, to provide redundancy in the manner of position detection and to allow multiple position indications and ambiguous position indications to be detected.

Figure 7:
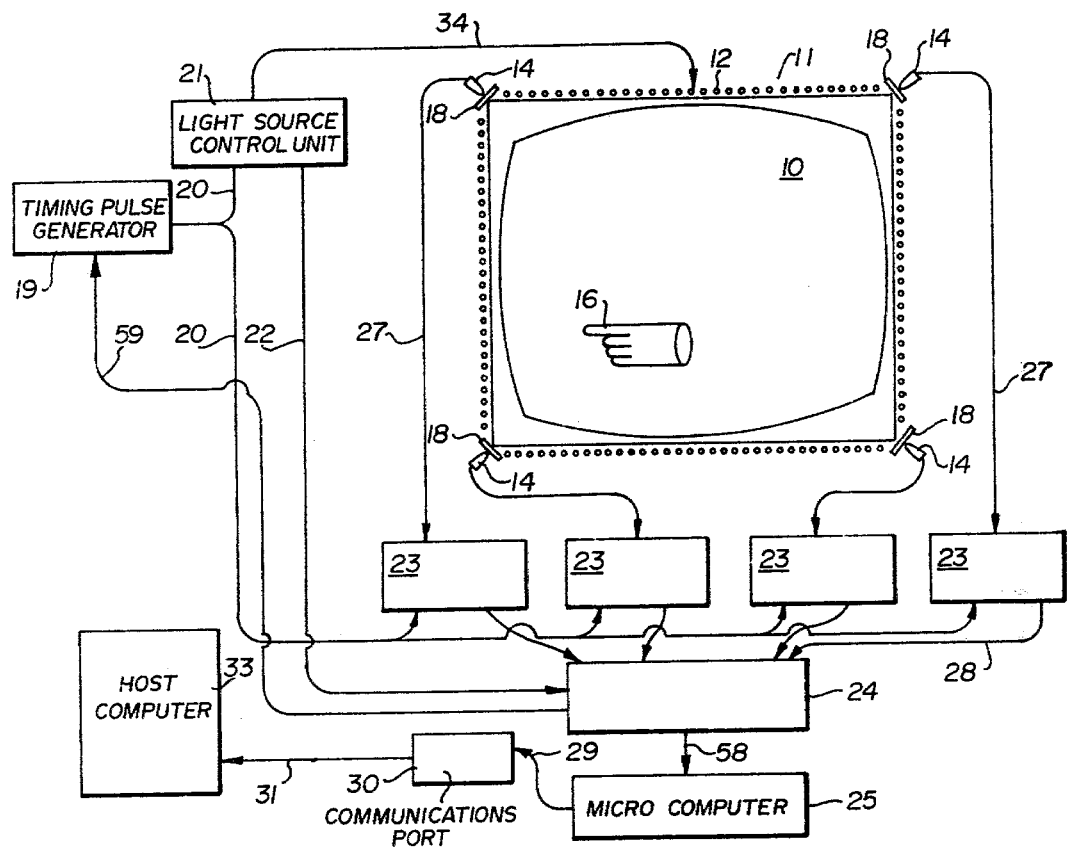
FIG. 7 shows a view corresponding to FIG. 1 with associated electronic circuitry shown in block diagram form.

Referring now to FIG. 7, it will be seen that the electronic circuitry associated with the light emitting diode array 11 includes a timing pulse generator 19, which is connected by a conductor 20 to a light source control unit 21 and to four pulse processing units 23.

The outputs of the photodetectors 14 are connected by conductors 27 to the pulse processing units 23, and the outputs of the latter are connected by conductors 28 to microcomputer interface apparatus 24 and then by conductor 58 to a microcomputer 25. The digital address indicating which light emitting diode is energized is transmitted from the light source control unit 21 to the microcomputer interface apparatus 24 via conductor 22.

The output of the microcomputer 25 is transmitted through conductor 29, communications port 30 and conductor 31 to an external computer 33.

Figure 9A:
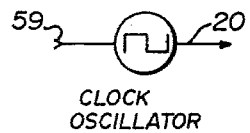
FIG. 9a shows a timing pulse generator forming part of the electronic circuitry of FIG 7.

Referring to FIG. 9a the timing pulse generator 19 is shown to be a simple oscillator which may be started and stopped by the interrupted control apparatus 24 via conductor 59.

Figure 9B:
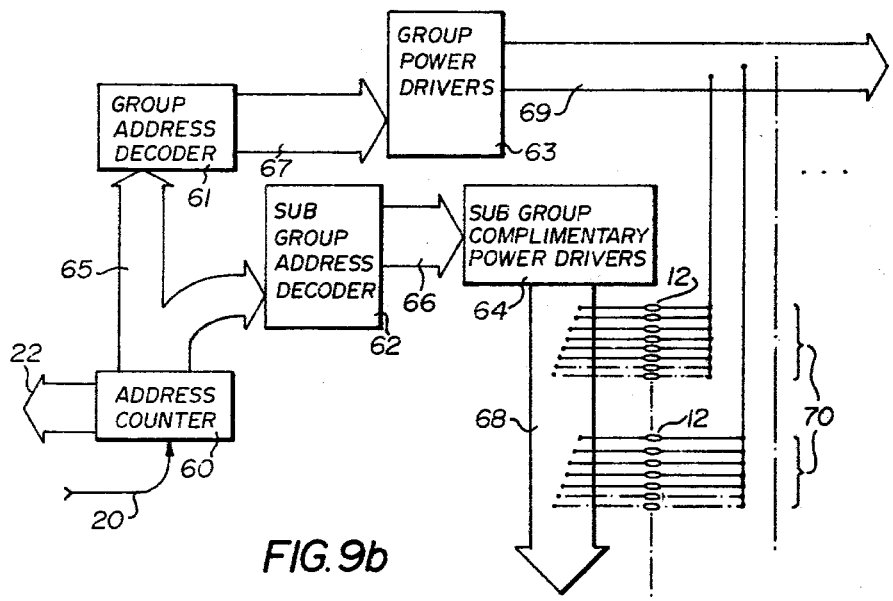
FIG. 9b shows a diagram of a light source control unit forming part of the electronic circuitry of FIG. 7.

FIG. 9b shows a block diagram of the light source control unit 21. The clock signal provided by the timing pulse generator is fed into the unit via conductor 20 and is attached to address counter 60. The current address of the address counter is made available on conductor 22. The address count is split into a group address (most significant bits) and a sub group address (least significant bits) and is fed to a group address decoder 61 and a sub group address decoder 62 via conductor 65. The group address decoder is connected to the group power drivers 63 via conductor 67 and the sub group address decoder is connected to the sub group complimentary power drivers 64 via conductor 66. The light emitting diodes 12 are arranged in groups 70 and each light emitting diode which is energized derives its power from conductors 68 and 69.

More particularly, while any number of light emitting diodes may be included in each group 70, in the preferred embodiment of the invention thirty-two light emitting diodes 12 are provided in each group and, when the apparatus is in operation, group address decoder 61 selects the group and sub-group address decoder selects the diode 12 to be energized within the selected group.

Figure 9C:
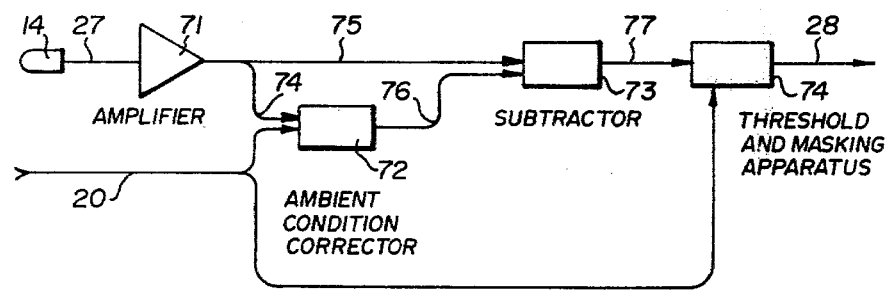
FIG. 9c shows a diagram of a pulse detecting apparatus forming part of the electronic circuitry of FIG. 7.

FIG. 9c shown one of the pulse detecting apparatuses 23. The respective photodetector 14 is connected to the pusle detecting apparatus by conductor 27 which connects an amplifier 71. Amplifier 71 connects to an ambient condition corrector 72 via conductor 74. The timing pulse generator 19 also connects to the ambient condition corrector 72 via conductor 20. The ambient condition corrector 72 determines the ambient signal level during the interval when the light emitting diode 12 is off between successive steps. The ambient condition corrector 72 connects to subtractor 73 via conductor 76. The amplifier 71 is also connected to the subtractor via conductor 75. The subtractor removes the effects of ambient light conditions. The subtractor is attached to the threshold and masking apparatus via conductor 77 and the clock is also attached via conductor 20. The resulting signal is routed via conductor 28 to the interrupt control apparatus 24 and then to the microcomputer 25.

The operation of the above-described apparatus is as follows:

Timing pulses from the timing pulse generator 19 are passed through conductor 20 to the light source control unit 21, which through a connection indicated by reference numeral 34 momentarily energizes the light emitting diodes 11 in succession, i.e. in the manner referred to hereinbefore.

If the finger 16, or some other pointer or object, is then introduced into the plane of the light emitting diode array 11, i.e. into the detection area, it will eclipse each of the photodetectors 14 in turn, as the light emitting diodes 11 are successively energized, in the manner described hereinabove.

Figure 4:
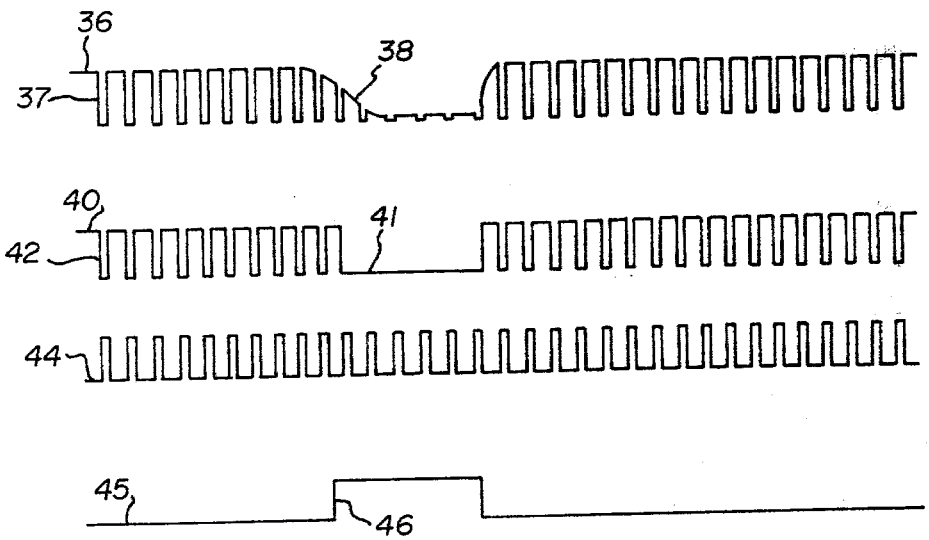
FIGS. 4, 5 and 6 illustrate waveforms derived from the photodetectors and from a timing pulse generator.

The waveform of the electrical output signal of one of the thus-eclipsed photodetectors 14 is illustrated at A in FIG. 4 and indicated by reference numeral 36.

Referring to FIG. 4, it will be seen, firstly, that the waveform 36 includes a series of negative-going pulses 37, caused by the transitions between the energization of successive ones of the light emitting diodes 11.

In addition, the waveform 36 includes a pulse 38 which results from the above-mentioned eclipse of the relevant photodetector 14 by the finger 16 or the like.

Thus, the pulse 38 in the waveform 36 represents the timing and the duration of this eclipse.

The amplitude of the waveform 36 also includes a component dependent upon the amount of ambient and reflected room light which falls on photodetector 14. An optical filter 18 may be used to make the photodetector 14 sensitive only to light in the frequency range produced by light emitting diodes 12 and thus to reduce the effect of ambient light. In one preferred embodiment infrared light emitting diodes 12 and an infrared filter 18 are used.

In the respective pulse processing unit 23, the waveform 36 is made digital by a common mode rejection amplifier and a threshold circuit to produce a digital waveform, which is indicated at B in FIG. 4 by reference numeral 40, and which includes a pulse 41 corresponding to the pulse 38 and negative-going pulses 42 corresponding to the pulses 37.

The waveform 40 is then masked by the timing pulse waveform fed from the timing pulse generator 19 to the relevant pulse processing unit 23 through the conductor 22, this timing pulse waveform being indicated by reference numeral 44 at C in FIG. 4.

The resulting waveform is inverted to produce the waveform 45 shown at D in FIG. 4, which contains a pulse 46 corresponding to the pulses 38 and 41 and representing the timing and duration of the eclipse.

Figure 5:
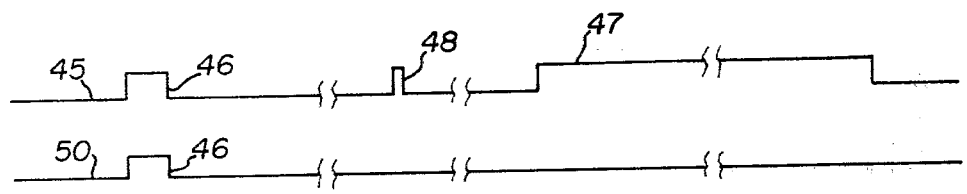

The pulse waveform 45 is also shown at A in FIG. 5, which illustrates in this waveform a further pulse 47 which results from illumination of the light emitting diodes 12 beyond the angle of acceptance of the relevant photodetector.

Other narrow pulses 48 exist, which are caused by obstructions resulting from the physical mounting of the photodetectors 14, optical filter 18 or light emitting diodes 12.

The microcomputer 25 is interrupted whenever a rising or falling edge of one of these pulses 45, 47, 48 occurs. The information communicated to the microcomputer at the time of such an interrupt is the sequential number of the light emitting diode 12 which is energized, which photodetector 14 has detected the pulse and whether it is a rising or falling edge. The sequential stepping of light emitting diodes 12 is suspended while the microcomputer 25 is in an interrupt state.

Software programs in the microcomputer 25 are used to mask out the unwanted pulses 47,48. Thus, it will be appreciated that the waveform 50, derived from one of the photodetectors 14, contains a single pulse 46, per cycle of the energization of the light emitting diode array 11, the pulse 46 representing the timing and duration of the eclipse caused by the finger 16 or the like.

It will be further appreciated that each of the other photodetectors 14 also produces a waveform having a single pulse caused by the eclipses of the other photodetectors 14, and these waveforms are indicated at 50, 50a, 50b and 50c, the pulses being indicated by 46, 46a, 46b and 46c. The timing of the pulses 46 and 46a to 46c is determined by the position of the finger 16 or the like in the detection area, and the width of these pulses is a function of both the position and the size of the finger 16 or the like, and in fact the waveforms shown in FIG. 6 illustrate the waveforms which are produced when the finger 16 or the like is placed near the centre of the screen and somewhat to the right thereof, as shown in FIG. 1.

Figure 6:
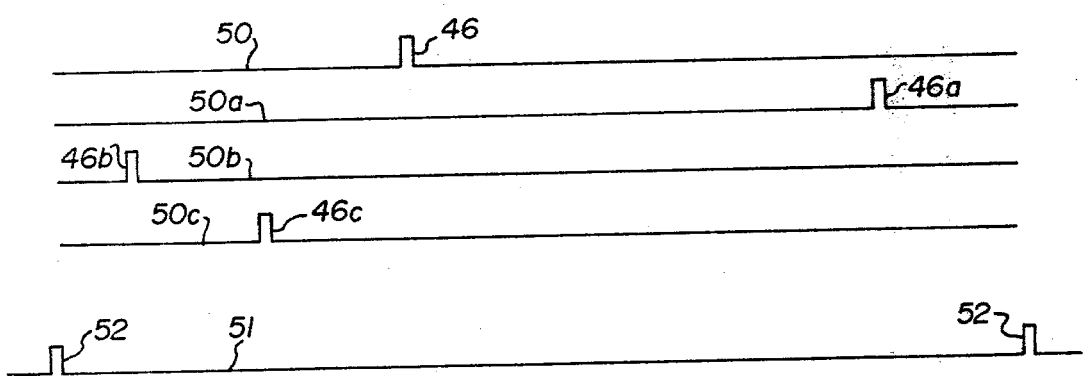

FIG. 6 also shows a waveform 51 including pulses 52 which indicate the beginnings of successive cycles of the energization of the light emitting diodes 12, and it will be apparent that the timing of the pulses 46 and 46a to 46c relative to the pulses 52 represents the position of the finger 16 on the screen, the centroid of each pulse being used for timing purposes.

The microcomputer 25 is also interrupted by the pulses 52 of waveform 51 to indicate the start of a cycle.

As can also be seen from FIG. 6, some of the pulses of the waveforms 50 and 50a to 50c are wider than the others, and the widths of these pulses, as indicated above, depends on the width of the finger 16 or the like and on the distance of the latter from the photodetectors.

Thus, if the finger 16 is near one of the photodetectors 14, it will subtend a large angle, and consequently a relatively wide pulse will be generated, whereas if the finger 16 is remote from the photodetector, the finger 16 will subtend a narrow angle and a narrow pulse will be generated.

Since the photodetectors 14 are disposed at opposite sides of the display screen 10, if the finger 16 is offset from the centre of the display screen 10 there will always be produced a narrow pulse and a wider pulse from the opposite photodetectors 14.

Any noise of jitter in the centroid of the finger position is minimized on the narrow pulse.

If the widths of the pulses 46 and 46a to 46c are too great, or if there are multiple pulses from each photodetector 14 within the period of the pulsed waveform 51, then an illegal condition such as a hand resting on the display screen 10 is detected. If the photodetector pulse widths are too narrow, then the object detected is too small.

A malfunction in one of the light emitting diodes 11 or elsewhere in the apparatus is detected when the timing information of the photodiodes pulses indicates a position outside the range of the screen for an ambiguous position.

The microcomputer 25 is used to convert the pulse timing information in the waveforms 50 and 50a to 50c into rectilinear cartesian co-ordinates by measuring the photodetector pulse widths and timings and determining firstly whether they indicate a legal event and, if so, calculating the cartesian co-ordinates. In the way, only legal cartesian co-ordinates are generated, and these are then communicated back through the communications port 30 and the conductor 31 to the computer 33.

Thus, it will be apparent to those skilled in the art, from consideration of the above-described embodiment, that the present invention not only enables the use of a large number of light sources and a minimum number of photodetectors and associated circuitry to provide good resolution of the position detection, as compared with the above-mentioned prior art devices employing a photodetector for each light source, but also offers a number of other substantial advantages.

For example, use of the four or more photodetectors provides redundancy in positioning information, so that false interactions, such as the placing of a hand on the display screen can be detected and properly handled. The apparatus automatically detects defective light sources and photodetectors, and is applicable to a large number of screen shapes, such as square, circular and rectangular shapes of a large variety of aspect ratios. Since no mechanical moving parts are employed, the present apparatus can be economically and ruggedly constructed, and in addition it provides a more natural and less fatiguing method of data entry than conventional computer input devices but without requiring any special stylus.

When eight or more photodetectors 14 are used as illustrated in FIG. 3, then it is possible to unambiguously detect two fingers or other indicating devices 16 which are placed on the screen at the same time.

Figure 8:
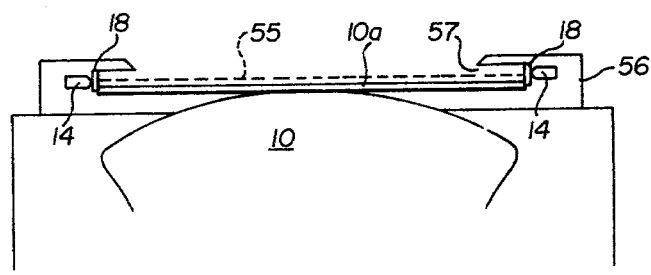
FIG. 8 shows a view taken in longitudinal cross-section through a cathode ray tube display screen provided with an object position detecting apparatus embodying the present invention.

In a preferred embodiment of the invention, as illustrated in FIG. 8, the light emitting diodes and the photodiodes 14 are mounted in the same optical plane, indicated by reference numeral 55, within a hollow frame or bezel 56 provided with a slot 57 which serves as a light shield to prevent ambient room light, and light from the display screen 10, from reaching the photodetectors 14. A working surface in the form of a sheet or plate 10a is positioned in front of the display screen 10.

Preferably, the light emitting diodes 11 are infrared emitting diodes, and the photodetectors 14 are provided with infrared filters 18, so that the operator cannot see the light generated and the problems of ambient light are reduced.

It is not essential for the photodetectors to be mounted in the same plane as the light emitting diodes, and in fact the former may be mounted in front of the plane of the latter so that both are intervisible even when the surface of the display screen is slightly curved.

The light emitting diodes may be flashed at rates such that the period of the cycle of energization is 1/40th second, i.e. each light emitting diode is flashed for 15 microseconds if 500 of the light emitting diodes are incorporated in the array 11, so that the user does not notice any apparent movement of the light. However, if desired, the light emitting diodes may be energized for longer periods of time, but preferably the period of the cycle of energization is less than ½ second, so that the user does not notice any appreciable delay in interaction, and this period should be less than 1/30th second when visible light emitting diodes are used, so that the user does not notice any visible flicker.

Instead of employing the microcomputer 25 for processing the waveforms shown in FIG. 6, use may be made for this purpose of the computer controlling the display screen 10, and thus an economy can be made by sharing the use of this computer, provided of course that the software and computational load of the computer is not exceeded.

Whereas the display screen 10 has been illustrated and described as being rectangular, it will be understood from the above description of the invention that, for example, a rectangular screen, e.g. having an aspect ratio of 3 to 4, or a square or circular screen may be employed, in which case a small change in the algorithms of the microcomputer can be readily effected.

The embodiments of the invention in which an exclusive property or privilege is claimed are defined as follows:

1. Apparatus for detecting the position of an object, said apparatus comprising:
   a plurality of radiation emitting means disposed in an array extending around the entire periphery of a detection area for, when energized, emitting radiation across the detection area;
   means for momentarily and successively energizing said radiation emitting devices to emit radiation across the detection area so that during the successive energization of the radiation emitting means the detection area is momentarily illuminated from all sides thereof in sequence:
   at least four radiation detecting means disposed at spaced apart locations around the periphery of the array for providing electrical signals in response to impingement of said radiation on said radiation detecting means, the number of said radiating detecting means being substantially less than the number of radiation emitting means; and
   electronic means for processing said electrical signals to detect interruption of said radiation by the presence of an object in the detection area and for providing data representing the position of said object in the detection area.

2. Apparatus as claimed in claim 1, wherein said radiation emitting means comprise infrared light emitting diodes and said radiation detecting means comprise photodiodes provided with infrared filters.

3. Apparatus as claimed in claim 1, wherein said energizing means comprise means for generating timing pulses and means responsive to said timing pulses for energizing said radiation emitting means one at a time in sequence around the array.

4. Apparatus as claimed in claim 3, further comprising means for comparing said electrical signals with said timing signals to eliminate from said electrical signals pulses resulting from the successive energization of said radiation emitting means.

5. Apparatus as claimed in claim 1, 2 or 3, wherein said radiation emitting and detecting means are accommodated within a hollow frame which is slotted to allow transmission of the radiation from said radiation emitting means to said radiation detecting means.

6. Apparatus as claimed in claim 1, 2 or 3, further comprising means for transmitting said data to a graphic display apparatus.

7. Apparatus comprising:
   a flat working surface;
   light emitting devices distributed in an endless array around the entire periphery of said working surface for transmitting light across said working surface from all sides thereof;

means for momentarily energizing said light emitting devices one at a time in succession around the endless array;

said energizing means including a timing pulse generator controlling the timing of the energization of said light emitting devices;

at least four light detecting devices disposed in spaced apart locations around the periphery of said working surface for providing respective electrical signals in response to the light;

the number of the light detecting devices being less than that of the light emitting devices;

each of said light detecting devices having an angle of acceptance embracing a plurality of said light emitting devices and the combined angles of acceptance of said light detecting devices embracing all of said light emitting devices, whereby an object interposed on said working surface in any of said angles of acceptance will modify at least two of said electrical signals in accordance with the position of the object.

8. Apparatus as claimed in claim 7, further comprising electronic data processing means responsive to said electrical signals and to the timing pulses of said pulse generator for computing the position of the object relative to said working surface.

9. Apparatus as claimed in claim 8, wherein said data processing means include means for masking each of the electrical signals during energization of said light emitting devices outside the angle of acceptance of the respective light detecting devices.

10. Apparatus as claimed in claim 8, wherein said data processing means include means for distinguishing objects larger than a predetermined size.

11. Apparatus as claimed in claim 8, 9 or 10, wherein said data processing means include means for detecting failure of said light emitting devices.

12. Apparatus as claimed in claim 8, 9 or 10, wherein said light emitting devices are infrared emitting devices and said light detecting devices are provided with infrared filters.

13. Apparatus as claimed in claim 8, 9 or 10, wherein said light emitting and detecting devices are provided in a frame extending around said working surface and apertured to allow the light to pass from said light emitting devices to said light detecting devices.

* * * * *